United States Patent
Akabe et al.

[11] Patent Number: 5,846,916
[45] Date of Patent: Dec. 8, 1998

[54] BEARING GREASE COMPOSITION FOR ABS PUMP

[75] Inventors: Seigo Akabe, Yokohama; Kazuhiro Matsumoto, Yamato; Yosiki Yamaguchi, Tokyo-to, all of Japan

[73] Assignee: NTN Corporation, Osaka-fu, Japan

[21] Appl. No.: 10,539

[22] Filed: Jan. 22, 1998

[30] Foreign Application Priority Data

Jan. 27, 1997 [JP] Japan .................................. 9-012611

[51] Int. Cl.⁶ ...................... C10M 105/76; C10M 115/08
[52] U.S. Cl. ............................................................. 508/211
[58] Field of Search ..................... 508/202, 211

[56] References Cited

U.S. PATENT DOCUMENTS

| | | | |
|---|---|---|---|
| 4,065,395 | 12/1977 | Bailey | 508/173 |
| 4,668,411 | 5/1987 | Yasui et al. | 508/552 |
| 4,929,369 | 5/1990 | Tury | 508/144 |
| 5,569,643 | 10/1996 | Kinoshita et al. | 508/155 |

*Primary Examiner*—Jacqueline V. Howard
*Attorney, Agent, or Firm*—Nikaido, Marmelstein, Murray & Oram LLP

[57] ABSTRACT

A bearing grease composition for ABS pumps comprises:
- a silicone oils having a viscosity of 100 to 1,000 cSt (at 25 degree-C.), the silicone oil serving as essential components of a base oil portion, and
- a diurea compound, as a thickening agent, at the compounding ratio of 2 to 30%-wt, the diurea compound having a general formula of:

$$R_1-NHCONH-R_2-NHCONH-R_3$$

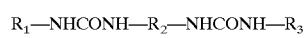

wherein $R_2$ indicates an aromatic bivalent hydroxyl group having the number of carbon atoms of 8 to 16, and $R_1$ and $R_3$ respectively indicate a saturated straight chain alkyl group having the number of carbon atoms of 6 to 18, and a cyclohexyl group, and wherein the ratio of the saturated straight chain alkyl group to the cyclohexyl group is within a range of 5 to 95%-mol to 95 to 5%-mol.

The grease composition does not give any adverse effects on rubber materials, such as natural rubbers or EPDM's, stably maintains its satisfactory performance over a wide range from very low temperatures to ultra low temperatures, and advantageously increases its durability particularly under a high-temperature environment.

1 Claim, 2 Drawing Sheets

Embodiments:

| test items and conditions: | Embodiment 1 | Embodiment 2 | Embodiment 3 |
|---|---|---|---|
| consistency  UP<br>(at 25 °C)  WP | 267<br>280 | 278<br>285 | 274<br>284 |
| dropping point (°C) | 250 | 250 | 287 |
| copper corrosion<br>(100°C × 24Hr) | pass | pass | pass |
| evaporation %-wt<br>(150°C × 22Hr) | 0.08 | 0.08 | 0.07 |
| oil separation %-wt<br>(150°C × 24Hr) | 0.90 | 0.86 | 0.42 |
| oxidation stability<br>Mpa(Kg/Cm$^3$)<br>(99°C × 100Hr) | 0.005<br>(0.05) | 0.007<br>(0.07) | 0.005<br>(0.05) |
| cold torque N·Cm(g-Cm)<br>-20°C  starting torque<br>       rotating torque<br>-40°C  starting torque<br>       rotating torque | 6.1(617.5)<br>3.5(357.5)<br>6.4(650)<br>2.4(247) | 6.4(650)<br>2.4(247)<br>7.3(747.5)<br>4.7(481) | 6.5(663)<br>3.6(390.5)<br>7.6(780)<br>4.8(487.5) |
| Type CRC bearing life test<br>(150°C, 10000rpm, 6204) | 6700 Hr | <5000 Hr | <5000 Hr |
| Type GT-4 bearing life test<br>(150°C, 10000rpm, 6204) | <1600 Hr | <1600 Hr | <1600 Hr |
| ASTM bearing life test<br>(150°C, 3500rpm, 6306) | <4500 | <4500 | <4500 |
| EPDM swelling test (%)<br>120°C × 70 Hr<br>        140 Hr<br>        210 Hr<br>        500 Hr | wt.   vol.<br>0.74   0.79<br>1.01   0.62<br>1.19   1.23<br>2.32   2.40 | wt.   vol.<br>0.70   0.71<br>1.00   0.65<br>1.14   1.20<br>2.12   2.35 | wt.   vol.<br>0.35   0.23<br>0.50   0.90<br>1.34   1.57<br>2.32   2.40 |
| Grease Constituents:<br>stearylamine<br>cyclohexylamine<br>diphenylamine<br>dimethyl silicone<br>(viscosity:200Cp/25°C)<br>methylphenyl silicone<br>(viscosity:200Cp/25°C)<br>phenylmethyl silicone<br>(viscosity:450Cp/25°C)<br>antioxidant | 2.5%<br>7.0%<br>6.5%<br>83.5%<br><br><br><br><br>0.5% | 4.3%<br>4.7%<br>8.0%<br><br><br>82.5%<br><br><br>0.5% | 4.3%<br>4.7%<br>8.0%<br><br><br><br><br>82.5%<br>0.5% | note: EPDM swelling test (blank)

| 120°C × | change in wt. | change in vol. |
|---|---|---|
| 70Hr | -0.74% | -0.56% |
| 140Hr | -0.59% | -0.67% |
| 210Hr | -0.25% | -0.17% |
| 500Hr | 0.20% | 0.45% |

Rubber materials used in ABS were used as test pieces.

| test items | Comparative EX.1 | Comparative EX.2 | Comparative EX.3 |
|---|---|---|---|
| appearance | milk color butter-like | light yellow butter-like | orange butter-like |
| consistency (UP) (WP) | 285 | 279 | 283 289 |
| dropping point (°C) | 277 | 288 | 268 |
| oil separation (%-wt) (100°C × 24Hr) | 0.7 | 0.1 | 0.9 |
| oxidation stability (Kg/Cm$^3$) (99°C × 100Hr) | 0.15 (0.015MPa) | 0.15 (0.015MPa) | 0.35 (0.035MPa) |
| cold torque (N-Cm) -20 °C: starting torque rotating torque | 8 (816g-Cm) 3.3 (340g-Cm) | 3.2 (3296g-Cm) 6.5 (670g-Cm) | 15 (1545g-Cm) 11 (1133g-Cm) |
| -40 °C: starting torque rotating torque | 27 (2781g-Cm) 11 (1133g-Cm) | 98 (10094g-Cm) 39 (4017g-Cm) | unable to measure |
| 4-ball withstand press. (200 rpm) | 8.5 (0.85 MPa) | 8.0 (0.80 MPa) | 1.0 (0.10 MPa) |
| water resistance (%-wt) (79 °C × 1 Hr) | 1.2 | 1.0 | 3.7 |
| swelling test (79 °C × 14days) | class A | class A | class A |
| EPDM swelling test 120°C × 70 Hr. vol. change wt. chang | unable to measure 65.2 | 37.2 32.3 | 9.5 6.5 |
| Type GT-4 bearing life test (150°C) | 517.7 Hr | 325.5 Hr | 66.6 Hr |
| thickener constituent | barium complex | urea based | sodium terephthalate |
| base oil constituent | alkylbenzene based synthetic oil | alkylenglycolic synthetic oil | alkylenglycolic synthetic oil |

BEARING GREASE COMPOSITION FOR ABS PUMP

BACKGROUND OF THE INVENTION

The invention relates to a lubricating grease composition usable for a bearing of a pump portion of a ABS (anti-lock brake system) hydraulic unit to be used mainly in electrical equipment for an automobile particularly during its running at high speeds.

ABS (anti-lock brake system) is a device which has been developed for preventing dangerous phenomena, such as tire lock or side slip, when a quick brake is applied in an automobile during its running on a road surface which becomes slippy, for example, due to rain or snow. The ABS is constructed, in part, by a sensor for detecting a wheel speed, a microcomputer for computing the output signal from the sensor and issuing a control command, and an actuator (ABS hydraulic unit) for controlling the pressure of brake fluid in accordance with the signal from the computer.

The ABS hydraulic unit is constructed by a motor, solenoid valves, and a pump (for example, piston pump). Upon receipt of a command, the motor is activated to cause an excessive amount of fluid to be escaped by means of the piston pump, so as to perform an appropriate control.

The pump of ABS hydraulic unit is operated under condition where it may be contacted with a brake fluid or a rubber seal. Thus, lubricating greases to be used in a bearing portion for driving the above kind of pump should have a property which gives minimal influences on the brake fluid or the rubber seal.

Usually, natural rubbers or EPDM's are used as a rubber seal for the above-mentioned portion. It is noted, however, that such rubbers may be deteriorated by mineral oils or synthetic oils which are widely used for lubrication purpose and easily become swelled. Thus, kind of oils to be selected for the rubber seal in order to prevent swelling of the rubber seal is very limited. Accordingly, materials for such oils are conventionally selected from a certain kind of mineral oils, alkyleneglycole, or alpha-olefin based synthetic resin.

It is noted, however, that such fats and fatty acids tend to be solidified or evaporated to become inoperative, at a low temperature of about −30 degree-C. or at a high temperature of about 150 degree-C. Accordingly, the use of such kind of lubricating greases in ABS equipment, which is important safety device, causes problems, under current environment wherein automobiles are advanced in their speed and performance.

SUMMARY OF THE INVENTION

The main object of the invention is to provide a bearing grease composition for ABS pumps which does not give adverse effects on rubber materials such as natural rubbers or EPDM's, which maintains its performance stably over a wide range from very low temperatures to ultra high temperatures, and which provides remarkable advantages in terms of increasing durability especially under a high-temperature environment.

In order to achieve the above object, the invention provides a bearing grease composition for ABS pumps which is featured by comprising essentially, as a principal component for base oil portion, a silicone oil having a viscosity ranging from 100 to 1,000 cSt at 25 degree-C., and, as a thickening agent, a diurea compound at a compounding ratio of 2 to 30%-wt., the diurea compound having the general formula of:

$$R_1-NHCONH-R_2-NHCONH-R_3$$

wherein: $R_2$ indicates aromatic bivalent hydrocarbon groups having the number of carbon atoms from 6 to 15, specifically, tolylene group, diphenylmethane group or dimethylbiphenylene group; $R_1$ and $R_3$ respectively indicate saturated straight chain alkyl groups and cyclohexyl groups having the number of carbon atoms from 6 to 18; the ratio between $R_1$ and $R_3$ is within the range of 5 to 95%-mol of the straight chain saturated alkyl groups to 95 to 5%-mol of the cyclohexyl groups, and preferably, within the range of 40 to 60%-mol of saturated alkyl groups to 60 to 40%-mol of cyclohexyl groups.

That is to say, the grease composition of the invention is produced by combining a silicone oil, as a base oil, with a special urea compound having compatibility with such silicone oil, as a thickening agent or thickener, so as to have an extended service life especially under higher temperatures.

Amines to be used in the above-mentioned reactions may include:
n-propylamine, isopropylamine, n-butylamine, isobutylamine, s-butylamine, n-pentylamine, 3-methylbutylamine, n-heptylamine, n-octylamine, 2-ethylhexylamine, n-tetradecylamine, n-hexadecylamine, n-octadecylamine, n-octadecylamine, aniline, 4-biphenylamine, p-phenetidine, p-anisidine, p-dodecylaniline, cyclopentylamine, cyclohexylamine, dihydroabiethylamine, 3,5,5-trimethylhexylamine, oleylamine and the like.

Isocyanates to be used in the above-mentioned reactions may include:
1,5-naphthylenediisocyanate, 4,4'-diphenylmethanediisocyanate, 2,4-tolylenediisocyanate, 3,3'-dimethyl-4,4'biphenylenediisocyanate, hexamethylenediisocyanate and the like.

The compounding ratio of the urea based thickening agent in the grease is preferably in the range of 2 to 30%-wt. This is because, when such a thickening agent in the amount less than 2%-wt is used, a grease in a liquid state having poor viscosity is produced, which tends to cause leakage easily and which is difficult to satisfactorily seal a bearing. It is also noted, however, that, when such a thickening agent in the amount exceeding 30%-wt is used, a grease in a solidified state having a consistency of 200 or less is produced, which has less serviceability for sealing a bearing.

It is noted that, if desired, antioxidants, preservatives, extreme-pressure agents, oiliness agents or the like may be added to the grease, provided that such agent(s) do not give adverse effects on the advantages of the invention.

In order to obtain a bearing grease in accordance with the invention, a quantity of solution consisting of two kinds of amines dissolved in a base oil is put into a solution consisting of diisocyanate mixed with a base oil, so as to form a mixed solution. The mixed solution is vigorously agitated, so as to facilitate the reaction process. Then, the mixed solution is heated and agitated until it reaches a temperature of 170 degree-C. The mixed solution is maintained at a maximum heating temperature for a predetermined period of time and then the heating operation is stopped. Thereafter, the mixed solution is cooled at a room temperature. When the mixed solution becomes a temperature of approximately 100 degree-C., requisite additives are added to the mixed solution. A desired operation, such as mixing, is performed for dissolution of the additives. The mixed solution is cooled until it reaches a room temperature. Then, a conventional finishing operation by means of a three-staged roll mill is performed, whereby a bearing grease of the invention may be easily obtained.

The silicone oil, constituting the main part of the invention, has a superior property at lower temperatures. Specifically, the silicone oil does not become consolidated and has a flowability, even at a ultra low temperature below −60 degree-C. It is also noted that the silicone oil has a flash point more than 300 degree-C. The silicone oil represents very small evaporation loss at higher temperatures. The silicone oil is also excellent in terms of oxidation stability and lubricity. The silicone oil does not give any adverse effects, such as swelling, on various kinds of rubbers other than silicone rubbers.

The grease composition according to the invention, having been produced intentionally in a manner that the silicone oil having the above-mentioned various superior properties constitutes the main portion of the base oil, has a particularly extended service life at higher temperatures, as compared to conventional greases, having been widely used heretofore, wherein mineral oils, alkyleneglycole, poly-alpha-olefine oils or the like are used as a principal constituent of a base oil.

It is noted, however, that improved performance, higher lubricity and extended service life at higher temperatures, as required for a bearing grease for ABS pumps, could not be obtained, when only a base oil possesses a heat-resistive property. Specifically, the combination of the silicone oil and thickening agents is a very important subject. For example, and when 12-hydroxystearic lithium, having been widely used as a thickening agent heretofore, is used as a thickening agent, the thus resulted grease tends to represent flowability at higher temperatures, even when a silicone oil is used as a base oil. Such a grease may be easily flown out from a lubrication part and has a less heat-resistive property. Thus, appropriate lubricity and extended service life could not be expected.

Urea based compounds have been widely used heretofore as a heat-resistive thickening agent. It is noted, however, that, when thickening agents, other than those in accordance with the invention, are used in combination with a silicone oil, the resultant grease might cause a high hardening effect at higher temperatures and over time on daily basis, so that it could not provide a sufficient lubricity and an extended service life.

The thickening agents proposed by the invention are diurea based compounds which are produced by reacting two amines having different constructions with diisocyanate. Silicone greases, produced using, as a thickening agent, urea compounds other than those according to the invention, provide an appropriate lubricity over a relatively wide temperature range, but they are not capable of providing an extended service life at high temperatures.

The lubrication mechanism of a bearing at higher temperatures is not sufficiently known and theoretically solved. It is believe, however, that the property of the constituents constituting thickening agents plays an important role in order to exert the above-mentioned functions.

The greases are in a semi-solid state at a room temperature, since the thickening agents therein have a three-dimensional network structure in a base oil, so that they may support oils by reason of their capillary force.

Such a structure may vary in various forms in accordance with increase in temperature. The bonded state may also vary significantly. Such states may be observed by checking the transition temperature representing change in crystalline state, using a differential thermal analysis. The transition temperature greatly depends upon constituents constituting a thickening agent used, but varies in a delicate manner depending upon the kinds and concentration of the base oil present therewith.

The grease filled within a bearing repeatedly experiences cycles between high temperature, since shearing action and metal-to-metal contact are repeatedly caused under the condition of load and high-speed rotation, and a room temperature or ultra low temperatures, due to stoppage of the bearing or atmosphere at low temperature.

Urea greases other than those in accordance with the invention may change their structural surfaces in their entirety as the above-mentioned cycles are repeated, so that phenomena, such as dissociation and hardening of oil, may be caused. This may lead to the worst condition in which a bearing is not sufficiently lubricated.

The constituents of the thickening agents according to the invention are featured by the diurea compounds which are formed by combining two kinds of amines having different constructions at an appropriate ratio and reacting them with an isocyanate. The portion of the two kinds of amines constituted by the compound formed by the straight chain aliphatic amines and the isocyanate may be dissolved in a base oil easily and has a less heat-resistive property. Thus, the portion will be dissolved easily, or flown to the raceway surface of the bearing, when the temperature in the bearing is increased, so as to form a strong lubrication film in its surface. This provides a satisfactory lubricity within the bearing at a high-speed rotation.

It is noted, however, that the above-mentioned property does not simply provide a very satisfactory result in terms of lubricity, since it causes flowing-out of the grease from the bearing. In order to avoid this, alicyclic amines having an increased performance in terms of heat-resistivity are combined. The thus combined alicyclic amines are reacted with an isocyanate to form a portion constituting a diurea compound. This portion prevents softening and flowing-out of the grease, and provide an increased heat-resistive property, so as to supplement the disadvantages of the aliphatic amines, whereby a heat-resistivity of the grease may be maintained.

Based on the above-mentioned concept, the construction of the thickening agent portion, constituting the lubricating grease according to the invention, includes, as principal components, two kinds of amines respectively bonded with diisocyanates, so as to form the thickening agent portion.

In a preferred configuration, the method of compounding and producing the grease should be studied, so that the compounds of amines bonded with the isocyanates respectively may be present in the system as much as possible. As the result of such studies, the most appropriate compounding ratio, together with the method of producing the grease have been found, whereby superior lubricating grease compositions have been obtained which may realize a satisfactory lubricity and an extended service life.

In the lubricating grease compositions in accordance with the invention, the base oil comprises a silicone oil as an essential constituent, and the thickening agent portion comprises two kinds of amines combined together at a ratio within a specific range. The base oil and the thickening agent portion are prepared in accordance with the production method which may produce compounds of an intended configuration when they are reacted with the isocyanate.

The thus prepared grease composition according to the invention presents an extended service life at higher temperatures, as will be appreciated from the foregoing. The grease composition is also very advantageous since it presents an extended service life in a lift test at higher speeds and higher temperatures. The grease composition also presents superior advantages in terms of swelling property relative to EPDM, whereby a grease composition most appropriate for a bearing grease for ABS pumps may be provided.

BRIEF DESCRIPTION OF THE DRAWINGS

FIG. 1 is a view showing evaluated results regarding the material properties and performance of a grease composition according to the invention.

FIG. 2 is a view showing evaluated results regarding the material properties and performance of a grease composition according to a comparative example.

DETAILED DESCRIPTION OF THE PREFERRED EMBODIMENTS

The invention will be explained more specifically with reference to the following embodiments and comparative examples.

It is noted that, in each of the embodiments and comparative examples below, a grease was produced based on the compounding ratio indicated in each of FIGS. 1 (representing the embodiments) and FIGS. 2 (representing the comparative examples), and the material properties and performance of the grease were evaluated according to the following methods.

1. worked penetration: JIS-K-2220
2. dropping point: JIS-K-2220
3. bearing lubrication life test: ASTM-D-1741 (test was conducted at 160 degree-C.)
4. Type CRC grease life test machine: manufactured by NTN Corporation in accordance with ASTM-D-3336-75 (test was conducted at 150 degree-C.)

[EMBODIMENTS 1 TO 3 AND COMPARATIVE EXAMPLES 1 TO 3]

A half amount of each of the base oils shown in FIGS. 1 and the total amount of isocyanate are put into a reactor and heated to 50 to 60 degree-C. Then, two kinds of amines and the remaining half amount of each of the base oils are put into a separate vessel and dissolved by heating them up to 70 to 80 degree-C., so as to form a dissolved solution. This dissolved solution is carefully poured into the reactor. The content in the reactor is vigorously agitated in order to facilitate the reaction process. Since this reaction is an exothermic reaction, the reactant is increased in its temperature. Agitation, together with circulation through piping are continued for about one hour, so that sufficient reaction and uniform dispersion are performed. Thereafter, the circulation through piping is performed intermittently, while increasing the temperature. The reactant is maintained at the temperature of 170 to 180 degree-C. for about one hour. Thereafter, the reactant is cooled to the room temperature.

Then, the reactant is finished by a three-staged mill, so as to obtain an intended grease.

The various raw materials shown in the embodiments have the following properties:

1. dimethyl silicone oil:
   kinetic viscosity (at 25 degree-C.) . . . 200 cp
   flash point . . . 315 degree-C.
2. methylphenyl silicone oil:
   kinetic viscosity (at 25 degree-C.) . . . 100 cp
   flash point . . . 330 degree-C.
3. phenylmethyl silicone oil:
   kinetic viscosity (at 26 degree-C.) . . . 450 cp
   flash point . . . 350 degree-C.

As shown in the embodiments, each of the greases according to the invention presents an extended service life of more than 4,000 hours in the lubrication life test conducted at 160 degree-C. Each of the greases according to the invention also presents an extended service life of more than 4,000 hours in the grease life test using CRC type machine, by which a high-speed lubrication performance is evaluated.

In the comparative examples 1 to 3, base oils other than silicone oils are used. The lubricating greases according to the comparative examples are conventionally sold as greases for ABS pumps. Each of these greases presents a short service life in the life test and less swelling property relative to EPDM. Thus, superiority of the grease according to the invention is verified.

We claim:

1. A bearing grease composition for anti-lock brake system pumps comprising:

a silicone oils having a viscosity of 100 to 1,000 cSt (at 25 degree-C.), the silicone oil serving as essential components of a base oil portion, and a diurea compound, as a thickening agent, at the compounding ratio of 2 to 30%-wt, the diurea compound having a general formula of:

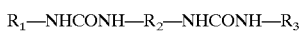

$R_1$—NHCONH—$R_2$—NHCONH—$R_3$ wherein $R_2$ indicates an aromatic bivalent hydroxyl group having the number of carbon atoms of 6 to 15, and $R_1$ and $R_3$ respectively indicate a saturated straight chain alkyl group having the number of carbon atoms of 6 to 18, and a cyclohexyl group, and wherein the ratio of the saturated straight chain alkyl group to the cyclohexyl group is within a range of 5 to 95%-mol to 95 to 5%-mol.

* * * * *